United States Patent Office 3,450,712
Patented June 17, 1969

3,450,712
METHOD FOR ISOLATING TRYPTOPHAN
Hirotoshi Samejima, Yuji Nagano, and Shigenori Ohta, Machida-shi, Japan, assignors to Kyowa Hakko Kogyo Co., Ltd., Tokyo, Japan, a corporation of Japan
Filed Sept. 13, 1966, Ser. No. 579,126
Claims priority, application Japan, Sept. 21, 1965, 65/57,422, 65/57,423
Int. Cl. C07d 27/60
U.S. Cl. 260—326.14
10 Claims

ABSTRACT OF THE DISCLOSURE

A method for isolating tryptophan from a mixture of amino acids by ion exchange which comprises passing the mixture through a strongly acidic cation exchange resin or a strongly basic anion exchange resin, eluting and removing substantially all of the amino acids except tryptophan by passing an inorganic salt through the resin, and eluting the tryptophan with a base (from a cation exchange resin) or an acid (from an anion exchange resin). Preferred ion exchange resins are those having a low degree of cross-linking (e.g., with not more than 6% of cross-linking) or a macro-reticular structure with a high porosity. These types of resins provide better adsorption and elution of tryptophan.

Figure 1:
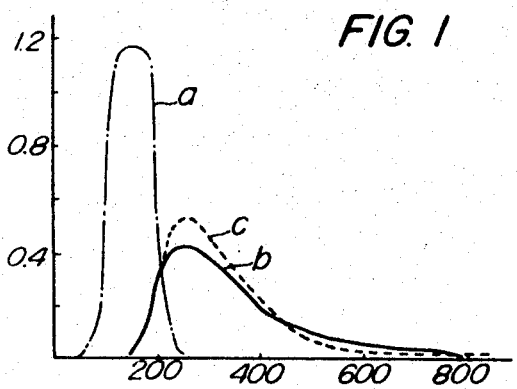

This invention relates to a method for isolating tryptophan. More particularly, it relates to a method for isolating highly pure tryptophan in high yield with ion exchange resins. Even more particularly, the present invention relates to a method for isolating highly pure tryptophan in high yield with ion exchange resin for tryptophan-containing solutions of mixed amino acids such as protein hydrolysis solutions or tryptophan fermentation solutions.

Tryptophan is one of the essential amino acids and is useful as a nutrient or as a medicine. The tryptophan content of proteins is generally low, and this material is manufactured by various methods, such as chemical synthetic methods, protein hydrolysis methods and fermentation methods with microorganisms. The protein hydrolysis solutions contain various amino acids in large quantities, which are the components of the protein, while the fermentation solutions often contain amino acids other than tryptophan.

Various methods have been used in the prior art for isolating tryptophan from such mixtures of amino acids. Examples thereof include precipitating tryptophan as the mercury salt, adsorbing the same with active carbon and isolating it with ion exchange resins.

The first mentioned method for recovering tryptophan as a mercury salt, however, is not suitable for commercial production because of the complexity of the process required. The second method using active carbon requires a large amount of active carbon and, furthermore, the use of a large amount of an organic solvent is necessary to elute the adsorbed tryptophan from the active carbon. The third method of using ion exchange resins has been limited to the treatment of a very small amount of tryptophan and is not applicable to a commercial scale production since the tryptophan in this case is separated by chromatography, employing buffer solutions of various pH values as eluents.

One of the objects of the present invention is to provide an improved method for isolating tryptophan from mixtures of amino acids which overcomes the disadvantages and deficiencies of the prior art methods.

Another object of the present invention is to provide a process for isolating tryptophan which may be carried out in an efficacious and simple manner.

A further object of the invention is to provide a method for isolating tryptophan from other substances which gives the tryptophan in high purity and good yield.

A still further object of the invention is to provide a method for isolating tryptophan which may be carried out advantageously and economically on an industrial scale to give a high yield.

These and other objects and advantages of the present invention will become apparent to those skilled in the art from a consideration of the following specification and claims.

The present inventors have now found a simple and commercial method for isolating and recovering tryptophan from protein hydrolysis solutions or fermentation solutions by means of ion exchange resins. In accordance with the present invention, this method comprises first eluting and removing amino acids other than tryptophan with an aqueous solution of a salt as an eluent and then eluting the tryptophan with an alkali, in the case of a strongly acidic cation exchange resin, or an acid, in the case of a strongly basic anion exchange resin.

When a strongly acidic cation exchange resin or a strongly basic anion exchange resin, which has adsorbed a mixture of amino acids, is washed with an aqueous solution of an inorganic salt, most of the amino acids other than tryptophan are first eluted and tryptophan is later eluted, with another eluent. In this way, tryptophan can thus be separated from other amino acids. The method according to the present invention is suitable for commercial production and has the advantages that it is by far simpler, it may be carried out under milder conditions and amino acids other than tryptophan can also be more easily recovered, compared with previously known ion exchange chromatography methods which employ large amounts of buffer solutions of various pH values as eluents.

The inorganic salt which may be employed in the method of the present invention may be a cheap commercial salt such as common salt (sodium chloride), ammonium chloride, ammonium sulfate and the like. The concentration of the salt solution may advantageously range from about 0.1 molar to 1.0 molar, 0.2 molar or so being sufficient. The amount of salt solution passed through the ion exchange resin column depends upon the starting material and the specific resin employed. The amount of eluent passed through a resin column in accordance with the present invention is five to twenty times the volume of the resin for a strongly acidic cation exchange resin and three to four times the volume of the resin for a strongly basic anion exchange resin. After passing this volume of salt solution through a column, the ion exchange resin is washed with water, and the tryptophan is then eluted with an alkali, in the case of a strongly acidic cation exchange resin, or an acid, in the case of a strongly basic anion exchange resin. Thus, a tryptophan-containing fraction is obtained. As this fraction is concentrated, a tryptophan precipitate settles. Highly pure tryptophan is then obtained by the decolorization and recrystallization of the precipitate.

Polystyrene sulfonic acid type strongly acidic cation exchange resins which may be employed in the method of the present invention include, for example, Amberlite IR–120, Amberlite XE–100, Diaion SK #1A, Diaion SK 104, etc. Polystyrene quaternary ammonium type strongly basic anion exchange resins which can be employed in the present invention include, for example, Amberlite IRA–400, Diaion SA 21, etc. Hereinafter, ion exchange resins indicated with the tradename of "Amberlite" are products of Rohm & Haas Co., U.S.A., and those with "Diaion" are products of Mitsubishi Kasei Kogyo K.K., Japan.

When resins of a particularly low degree of cross-linking are employed, the tryptophan is more selectively adsorbed than the other amino acids, and the elution is also carried out more easily. However, when ordinary strongly acid cation exchange resins are employed, it is difficult to elute the adsorbed tryptophan completely with an alkali since the tryptophan remains strongly bonded to the resin. It has been attempted, therefore, to elute the adsorbed tryptophan with an alkali containing an organic solvent such as alcohol and the like, but tryptophan cannot be eluted completely even with this eluent. On the other hand, the use of strongly basic anion exchange resins has another disadvantage in addition to those mentioned above in that tryptophan is likely to decompose when an acid is used as the eluent. Thus, it can be seen that certain serious problems arise in the treatment of tryptophan-containing solutions with ion exchange resins.

As the result of much research on this subject matter, the present inventors have found that the internal structure of the resins plays an important part in the successful adsorption and elution of tryptophan. It has been found that the relationship between the size of the tryptophan molecule, which is a comparatively large molecule for an amino acid, and the size of the space within the resin particles has a remarkable effect on the adsorption and elution of tryptophan.

As for adsorption, when a solution containing a large amount of impurity cations as well as amino acids other than tryptophan is passed through a resin column, strongly acidic cation exchange resins having a low degree of cross-linking adsorb a larger amount of tryptophan selectively than resins having a high degree of cross-linking, although the former resins have a smaller exchange capacity than the latter resins. On the other hand, the adsorption of the impurity cations as well as the amino acids other than tryptophan is proportional to the exchange capacity of the resins. Accordingly, the lower the degree of cross-linking that the resins have, the smaller the amount of these cations that is adsorbed. As a result, the amount of starting material which may be treated with a definite amount of the resins is increased, and the separation of tryptophan from such impurities is also more readily accomplished.

Thus, according to another aspect of the present invention, there is provided a method for isolating tryptophan from tryptophan-containing solution with ion exchange resins characterized in that resins having a low degree of cross-linking or macro-reticular resins having a high porosity are employed so that the tryptophan may be selectively adsorbed and the adsorbed tryptophan may then be easily eluted.

As a resin having a low degree of cross-linking, for example, a sulfonic cation exchange resin having a divinylbenzene (DVB) content of not more than 6% can be employed, such as Amberlite XE–100, Diaion SK–104, etc. From the point of view of elution, the tryptophan adsorbed with sulfonic cation exchange resins having a DVB content of about 8%, which are most frequently used, such as Amberlite IR–120, Diaion SK #1A, etc., as described above, is difficult to elute. When strongly acidic cation exchange resins having large spaces within the resin particles are used, however, such as sulfonic cation exchange resins having a low degree of cross-linking, the adsorbed tryptophan can be easily and readily eluted with an alkali, i.e., a base.

FIGURE 1 illustrates elution curves obtained by adsorbing 120 milligrams of tryptophan with resin columns packed, respectively, with 100 milliliters of Diaion SK 102, Diaion SK #1A and Diaion SK 116 (H type) which are sulfonic cation exchange resins having, respectively, a DVB content of 2% (indicated by $a$ in the figure), 8% (indicated by $b$ in the figure) and 16% (indicated by $c$ in the figure), and then eluting the adsorbed tryptophan with 1 N ammonia water. In FIGURE 1, the horizontal axis represents the volume of the eluents (in ml.), and the vertical axis represents the concentration of tryptophan (in mg./ml.).

The effect of the degree of cross-linking of the resins upon the elution of tryptophan can be clearly seen from FIGURE 1. Moreover, as noted above, if the macro-reticular resins used have a high porosity, the tryptophan can also be easily eluted therefrom. As strongly acid cation exchange resins having a low degree of cross-linking, the above mentioned sulfonic cation exchange resins having a DVB content of not more than 6% can be employed. As macro-reticular resins having a high porosity, Amberlite 200, for example, can be employed.

By using such resins, which have a high capability for selectively adsorbing tryptophan and from which the adsorbed tryptophan can be readily eluted, in accordance with the present invention, the adsorption and elution of tryptophan results in a high yield thereof. Concentration and purification steps can then be effected to produce a product having high purity. In the case of tryptophan-containing solutions, which contain large quantities of cation impurities as well, such as protein hydrolysis solutions and fermentation solutions, it is possible to selectively adsorb large amounts of tryptophan with sulfonic cation exchange resins having a low degree of cross-linking and then to readily elute the adsorbed tryptophan. The separation of impurities and concentration of the product, therefore, can be accomplished with a very good efficiency. This method can also be employed, for example, to recover L-tryptophan alone from the enzymatic asymmetric hydrolysis solution of DL-acyltryptophan.

The same may also be said of strongly basic anion exchange resins. For example, when a strongly basic anion exchange resin having a low degree of cross-linking is employed, the adsorbed tryptophan can be more easily eluted than with resins having a high degree of cross-linking.

The following examples are given merely as illustrative of the present invention and are not to be considered as limiting.

EXAMPLE 1

A fermentation solution containing 2.40 mg./ml. of tryptophan and, respectively, 1 to 10 mg./ml. of alanine, glutamic acid, valine, leucine, isoleucine, lysine, phenylalanine and the like is adjusted to a pH of 2 with hydrochloric acid. The microbial cells are then removed therefrom by centrifuging.

1.2 liters of this solution is passed through an ion exchange resin column packed with 100 ml. of Amberlite XE–100 (H type) at a space velocity of 2. After washing with water, 1.5 liters of a 0.2 M aqueous solution of ammonium chloride is passed through the column at a space velocity of 2 and 100 ml. of water is then passed therethrough. Thereafter, 0.2 N aqueous ammonia is passed through the column at a space velocity of 2, at which time 500 ml. of a tryptophan-containing fraction is obtained.

Figure 2:
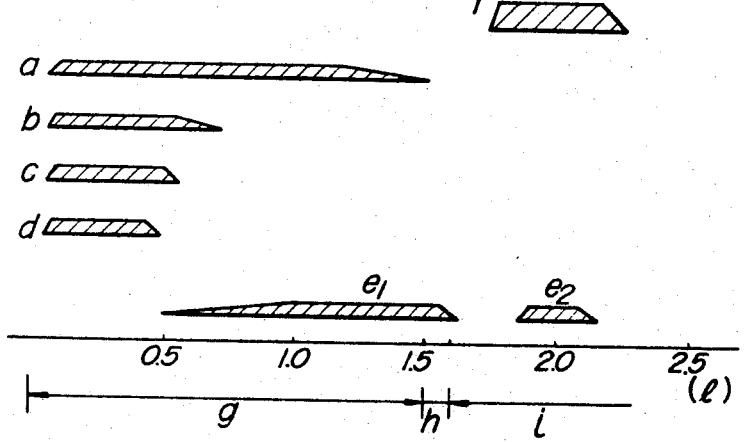

FIGURE 2 illustrates the elution of tryptophan and other amino acids at this stage of the process, as traced by the development of paper chromatography. In the figure, $a$ represents leucine, isoleucine and phenylalanine, $b$ represents valine, $c$ represents alanine, $d$ represents glutamic acid, $e_1$ and $e_2$ represent lysine, $f$ represents tryptophan, g represents a 0.2 M aqueous solution of ammonium chloride, h represents water, and i represents 0.2 M aqueous ammonia.

The amount of tryptophan transferred into the aqueous solution of ammonium chloride and the wash liquid is 2.7% of the tryptophan which had been contained in the starting fermentation solution, while 97.3% thereof is recovered in the tryptophan fraction eluted with ammonia. In this fraction, only lysine is observed as an amino acid obtained other than tryptophan. When the eluted tryptophan fraction is concentrated under reduced pressure, crystals of tryptophan settle. After cooling, these crystals are filtered and then again dissolved in a hot 50% alcohol (ethanol) solution. When the resultant solution is then decolorized with a small amount of active carbon and is allowed to cool, white crystals of tryptophan are obtained. The filtered and dried crystals weigh 1.5 grams and have a purity of 99.8%.

EXAMPLE 2

One liter of the solution obtained by adjusting the tryptophan-containing fermentation solution of Example 1 to a pH of 12 with sodium hydroxide and centrifuging the same is passed through an ion exchange resin column packed with 100 ml. of Diaion SA 21A (Cl type) at a space velocity of 2. After washing with water, 300 ml. of a 0.2 M aqueous solution of sodium chloride is passed through the coumn at a space velocity of 2. After further washing with 100 ml. of water, tryptophan is eluted therefrom with 0.5 N hydrochloric acid. In this way, 600 ml. of a tryptophan-containing fraction is obtained.

Most of the amino acids other than tryptophan are transferred into the sodium chloride eluent. The amount of tryptophan present in this eluent is 5.2% of the tryptophan which had been contained in the starting solution, while 89.3% of the tryptophan is recovered in the 600 ml. of eluted tryptophan fraction.

EXAMPLE 3

Figure 3:
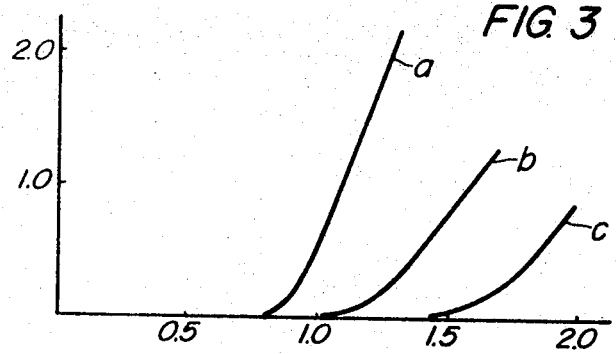

The solution obtained by adjusting a fermentation solution having an L-tryptophan concentration of 2.18 mg./ml. to a pH of 2 with hydrochloric acid and removing the microbial cells therefrom by centrifuging is passed through a resin column packed with 100 ml. of Diaion SK 104 (H type), the DVB content being 4%, as indicated by c in FIGURE 3, at a rate of 200 ml. per hour. Tryptophan is not observed as coming out of the column until after 1.4 liters of the solution is passed through the column. However, amino acid impurities such as alanine, glutamic acid, leucine, valine, etc., leak out from the column when only 400 ml. of the solution is passed through the column. The amount of solution which is passed through the column until tryptophan leaks out is 1.0 liter with the same treatment but with a column packed with 100 ml. of Diaion SK #1A (H type) ion exchange resin, the DVB content thereof being 8% as indicated by b in FIGURE 3. With 100 ml. of Diaion SK 112 (H type), the DVB content thereof being 12%, as indicated by a in FIGURE 3, packed in the column, the amount of solution passed therethrough before tryptophan leaks out is 0.7 liter. FIGURE 3 thus illustrates the leakage curves obtained by this treatment, wherein the horizontal axis represents the amount of the eluents (in liters) and the vertical axis represents the concentration of tryptophan (in mg./ml.).

EXAMPLE 4

Two liters of an aqueous solution of DL-tryptophan having a concentration of 0.2 mg./ml. is passed through a resin column packed with 100 ml. of Amberlite XE–100 (H type) to adsorb tryptophan. After washing with water, the adsorbed tryptophan is eluted with 0.2 N aqueous ammonia, and 100% of the tryptophan originally present is recovered from 250 ml. of the tryptophan-containing fraction.

On the other hand, when the same treatment is carried out with 100 ml. of Amberlite IR–120 (H type), the percentage of tryptophan recovered is 93.2% even if 900 ml. of the eluted fraction is collected.

EXAMPLE 5

1.4 liters of the solution obtained by adjusting a fermentation solution having an L-tryptophan concentration of 3.35 mg./ml. to a pH of 2 with hydrochloric acid and removing the microbial cells therefrom by centrifuging is passed through a resin column packed with 100 ml. of Diaion SK 104 (H type) at a rate of 200 ml. per hour. After washing with water, the adsorbed tryptophan is eluted with 2 N aqueous ammonia. As a result, 350 ml. of tryptophan-containing eluted fraction is obtained. The percentage of tryptophan recovered is 99.8%.

The same treatment is carried out with a resin column, packed with 100 ml. of Diaion SK #1A (H type). One liter of the above-mentioned fermentation solution, having a pH of 2, which had been centrifuged to remove the microbial cells therefrom is passed through the resin column. After washing with water, the adsorbed tryptophan is eluted with 0.2 N aqueous ammonia. The percentage of tryptophan recovered is 87.5%, even when only 1.0 liter of the eluted tryptophan fraction is collected.

The invention being thus described, it will be obvious that the same may be varied in many ways. Such variations are not to be regarded as a departure from the spirit and scope of the invention.

1. A method for isolating tryptophan from a mixture of amino acids containing tryptophan by means of an ion exchange resin treatment which comprises passing said mixture through an ion exchange resin selected from the group consisting of polystyrene, sulfonic acid type strongly acidic cation exchange resins having a divinylbenzene content of not more than 6% and polystyrene quaternary ammonium type strongly basic anion exchange resins, eluting and removing the amino acids present in said mixture other than tryptophan from said resin with an aqueous solution of an inorganic salt selected from the group consisting of sodium chloride, ammonium chloride and ammonium sulfate as an eluent, and then eluting the tryptophan from said resin with a base selected from the group consisting of caustic alkalies and ammonia, if a strongly acidic cation exchange resin is used, and with a 0.1–2 N inorganic acid, if a strongly basic anion exchange resin is used.

2. The method of claim 1, wherein the concentration of said aqueous solution of inorganic salt is from about 0.1 molar to 1.0 molar.

3. The method of claim 1, wherein the amount of said aqueous solution of inorganic salt passed through said resin is from 5 to 20 times the volume of the resin, when a strongly acidic cation exchange resin is employed.

4. The method of claim 1, wherein the amount of said aqueous solution of inorganic salt passed through said resin, when a strongly basic anion exchange resin is employed.

5. The method of claim 1, wherein said basic eluent is an aqueous ammonia solution.

6. The method of claim 1, wherein said acid eluent is hydrochloric acid.

7. A method for isolating tryptophan from a tryptophan-containing solution by means of an ion exchange resin treatment which comprises passing said solution through an ion exchange resin selected from the group consisting of polystyrene sulfonic acid type strongly acidic cation exchange resins having a divinylbenzene content of not more than 6% and polystyrene quaternary ammonium type strongly basic anion exchange resins, eluting and removing the substances present in said solution other than tryptophan from said resin with an aqueous solution of an inorganic salt selected from the group consisting of sodium chloride, ammonium chloride and ammonium sulfate as an eluent, and then eluting the tryptophan from said resin with a base selected from the group consisting of caustic alkalies and ammonia, if a strongly acid cation exchange resin is used, and with a 0.1–2 N inorganic acid, if a strongly basic anion exchange resin is used.

8. The method of claim 7, wherein the concentration of said aqueous solution of inorganic salt is from about 0.1 molar to 1.0 molar.

9. The method of claim 7, wherein said ion exchange resin is a macro-reticular ion exchange resin having a high porosity.

10. The process of claim 7, wherein said strongly basic anion exchange resin has a low degree of cross-linking.

References Cited
UNITED STATES PATENTS 2,700,672   1/1955   Morris _____ 260—326.14

ALEX MAZEL, *Primary Examiner.*

J. A. NARCAVAGE, *Assistant Examiner.*